United States Patent [19]
Balachandran et al.

[11] Patent Number: 5,881,105
[45] Date of Patent: Mar. 9, 1999

[54] SYSTEM AND METHOD FOR THE NON-SEQUENTIAL TRANSMISSION OF CONTROL SIGNALS WITHIN A SPEECH TRANSMISSION

[75] Inventors: Kumar Balachandran, Cary; Paul Dent, Pittsboro, both of N.C.

[73] Assignee: Ericsson, Inc., Triangle Park, N.C.

[21] Appl. No.: 760,417

[22] Filed: Dec. 3, 1996

[51] Int. Cl.$^6$ .................................................. H04L 27/00
[52] U.S. Cl. ...................... 375/259; 370/522; 370/523; 370/498
[58] Field of Search ........................... 375/259; 370/522, 370/523, 498, 474, 321, 337, 311

[56] References Cited

U.S. PATENT DOCUMENTS

| | | | |
|---|---|---|---|
| 4,245,340 | 1/1981 | Landry | 370/111 |
| 4,437,183 | 3/1984 | Profet | 370/110.1 |
| 4,967,407 | 10/1990 | Lynk et al. | 370/50 |
| 5,323,398 | 6/1994 | Wake et al | 370/110.1 |
| 5,331,450 | 7/1994 | Heep et al. | 359/135 |
| 5,506,843 | 4/1996 | Tanaka | 370/68 |
| 5,617,412 | 4/1997 | Delprat et al. | 370/281 |
| 5,650,999 | 7/1997 | Dickson | 370/231 |
| 5,684,806 | 11/1997 | Akiyama | 370/522 |
| 5,793,756 | 8/1998 | Ayerst et al. | 370/311 |

FOREIGN PATENT DOCUMENTS

| | | |
|---|---|---|
| 0 382 363 A2 | 1/1990 | European Pat. Off. |
| 0 765 050 A2 | 9/1996 | European Pat. Off. |
| WO 91/02436 | 2/1991 | WIPO |

*Primary Examiner*—Stephen Chin
*Assistant Examiner*—Mohammad Ghayour
*Attorney, Agent, or Firm*—Jenkens & Gilchrist

[57] ABSTRACT

A telecommunications system and method for minimizing interruptions to voice transmissions due to the transmission of overriding control signals is disclosed. Since FACCH and other control signals replace or block-out speech data, the quality of speech transmissions deteriorates the longer the control transmission. Through modifications to the FACCH protocol, lengthy sequential FACCH or other control transmissions are divided into a plurality of discrete control segments, which are transmitted non-sequentially throughout a speech transmission, and queued at the receiving end. After receipt of all of the control segments, the original control message is reconstructed and forwarded for processing.

60 Claims, 4 Drawing Sheets

SYSTEM AND METHOD FOR THE NON-SEQUENTIAL TRANSMISSION OF CONTROL SIGNALS WITHIN A SPEECH TRANSMISSION

BACKGROUND OF THE INVENTION

Field of the Invention

The present invention relates to a communications system and method, particularly, to a communications protocol for minimizing interruption to speech transmissions, and, more particularly, to an improved system and method for non-sequentially and unobtrusively interspersing fixed or variable-length control signals within a speech transmission.

BACKGROUND AND OBJECTS OF THE INVENTION

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

The Global System for Mobile (GSM) communications is a second generation cellular system standard developed to solve various fragmentation problems of the first cellular systems in Europe. GSM is the world's first cellular system to specify digital modulation and network level architectures and services. Currently, GSM is the most popular standard for new radio and personal communications equipment throughout the world.

The Association of SouthEast Asian Nations' (ASEAN) Cellular Satellite (ACeS) system, still in the specification stage, is essentially an adaption of the GSM specification and is designed to provide telephone coverage by use of a geo-stationary satellite. Expected to be deployed over SouthEast Asia, ACeS would provide coverage to areas having limited land-line and cellular infrastructures, allowing use of hand-held pocket phones across Asia. When deployed, the satellite footprint of the ACeS system will allow service from India to Japan and from Northern China to Indonesia using a large number of spot beams. Although ACeS attempts to adhere to the GSM standard, such as in maintaining the same logical to physical channel mapping, there are nonetheless differences between the systems, such as the introduction of a high-margin channel to reach disadvantaged users and a lower speech coder rate. In contrast to the GSM full rate speech of 13 Kb/s, the ACeS system has a target half-rate speech vocoder that codes speech to about 4 Kb/s. Also, the basic system supports up to 32 users per 200 KHz channel versus GSM's 8 users for the same bandwidth. A robust speech mode in ACeS offers a slightly better channel rate at the same vocoder rate by packing 16 users per 200 KHz channel.

In GSM, all associated and common control channel signaling formats are defined on the basis of fixed length messages that undergo extensive error control coding prior to transmission over the airlink. For example, a fixed length message is block encoded using a conventional fire code and then convolutionally encoded. The resultant encoded message is then interleaved and sent as part of the corresponding logical channel, i.e., the Broadcast Control Channel, the Common Control Channels or the Associated Control Channels.

Through one of the Associated Control Channels, the Fast Associated Control Channel (FACCH), control signals are sent in-band with the speech transmission. FACCH provides quick communication between a base station and a cellular phone for purposes such as hand-overs between cells. However, FACCH messages steal or blank out speech while the necessary handover or other signaling information is exchanged. In GSM, the impact to speech quality due to FACCH overrides is minimized due to the fact that a FACCH message in GSM is of fixed length and affects at most one sample segment of speech, i.e., about 20 ms worth. After encoding, FACCH messages in GSM take up the same number of frames as the speech data for 20 ms. Accordingly, unless multiple FACCH messages are sent in quick succession, FACCH interruptions to speech transmissions in GSM are limited to 20 ms worth of speech, which can be easily masked.

As a result of ACeS' adherence to GSM's network protocols, the same FACCH message structure is used. However, because of the larger number of simultaneous users and lower speech coding rate, the FACCH messages affect larger sample segments of speech, e.g., up to 80 ms worth, the loss of which is readily perceptible to a user.

Accordingly, it is an object of the present invention to minimize the interruption of speech data caused by FACCH or other overriding control messages in an ACeS or other system in which such messages adversely affect the quality of a speech transmission.

It is also an object of the present invention to shorten the length of an ACeS FACCH message where possible, thereby shortening the length of interruption to speech transmissions.

It is another object of the present invention to provide a variable length, as opposed to fixed length, FACCH or other control message, which by virtue of generally having a shorter transmission length, minimizes the number and duration of interruptions to speech transmissions.

It is a further object of the present invention to divide lengthy FACCH or other control signal messages into smaller control signal segments thereof and intersperse the smaller control signal segments between discrete speech sample segments in a speech transmission so as to prevent consecutive speech interruptions due to lengthy bursts of control signal messages, such as during handovers.

SUMMARY OF THE INVENTION

The present invention is directed to a communications system and method for minimizing interruptions to speech transmissions due to the transmission of overriding control signals. Since FACCH and other control signals replace or block-out speech data, the quality of voice transmissions deteriorates the longer the control signal transmission. Through modifications to the FACCH protocol, lengthy sequential FACCH or other control signal transmissions are divided into a plurality of discrete control signal segments, which are transmitted non-sequentially throughout a speech transmission with minimal disruption to the quality of the speech. The interspersed control signal segments so transmitted are then queued at the receiving end. After receipt of all of the control signal segments, the original control signal message is reconstructed and forwarded for processing.

BRIEF DESCRIPTION OF THE DRAWINGS

These and other features and advantages of the present invention will be better and more completely understood with reference to the following detailed description of a presently preferred embodiment in connection with the drawings, of which.

DETAILED DESCRIPTION OF THE PREFERRED EMBODIMENT

Before describing the communications system and method for non-sequentially transmitting control signals within a speech transmission, such as in an ACeS system, it is useful to first describe the communication environment of the GSM system upon which ACeS is based.

Figure 1:
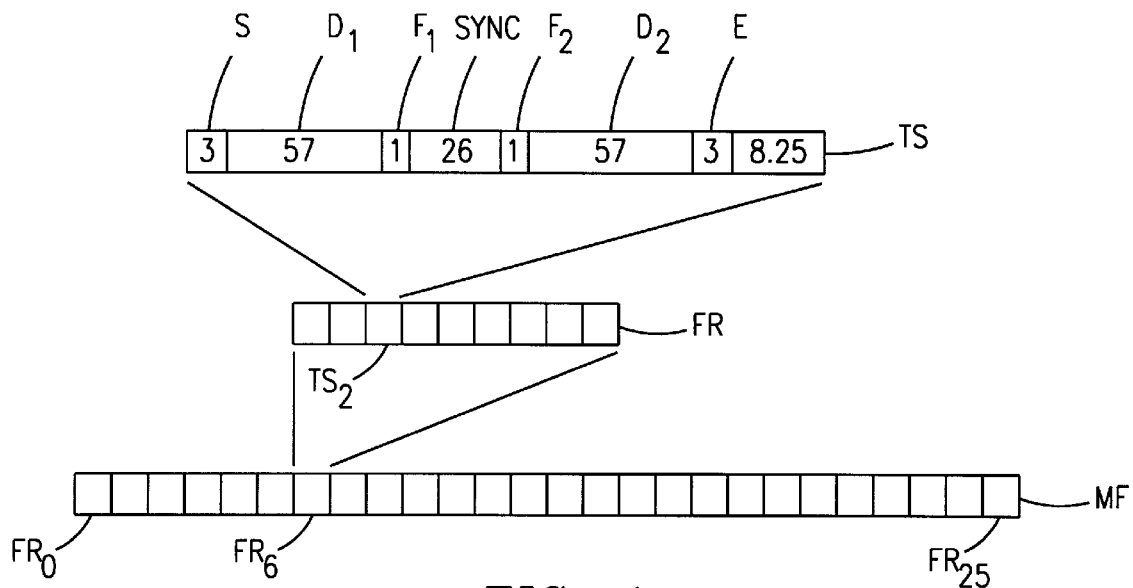
FIG. 1 is a block diagram illustrating the format of a frame timeslot in normal burst mode in GSM.

Under GSM, speech data and control signal data from the Fast Associated Control Channel (FACCH) are transmitted over a multiplicity of bursts in GSM. The format of a normal transmission burst protocol in GSM is shown in FIG. 1. With speech processing at the rate of 13 Kps, 260 bits of speech are generated every 20 ms. With block and convolutional coding, those 260 bits are expanded to 456 bits for each 20 ms sample. Of the 456 bits, 57 at a time are interleaved with 57 other bits from an adjacent speech data block for that user to form a data burst of 114 bits, encompassing the two data fields $D_1$ and $D_2$ in FIG. 1.

The 42.25 additional bits in the burst include: 26 synchronizing (SYNC) bits, allowing burst demodulation with no information from previous bursts; time slot start (S) and end (E) tail flags of 3 bits each, allowing the impulse response of the channel and modulation filter to terminate within the burst, ensuring that end bit demodulation is the same as at the burst middle; two one-bit flags ($F_1$ and $F_2$) to distinguish the data origin; and 8.25 guard bits (GB) for up/down ramping time. The $F_1$ bit indicates whether the data in the preceding burst was either speech data or FACCH data, and the $F_2$ bit indicates the origin of the data in the current burst. It should be understood that the aforedescribed data and other bits in each burst are preferably interleaved in a conventional way with other such bursts during transmission.

In this manner, the encoded 456 bits of speech are transmitted, with interleaving, over 8 bursts in GSM. With Time Division Multiple Access (TDMA), those 8 bursts are delegated to a particular time slot (TS) within a frame FR, e.g., $TS_2$ in FIG. 1. In GSM, each frame FR has eight timeslots ($TS_0$ to $TS_7$) therein, each of which is assigned to a different user. In turn, frame FR is one of 26 frames in a multiframe MF, which is one of 50 multiframes in a superframe, which is one of 2047 superframes in a hyperframe (not shown).

As discussed, FACCH messages operate in stealing mode, i.e., in GSM one 20 ms segment of speech data is exchanged for a corresponding amount of FACCH control signals, such as handover information. Although the number of significant FACCH bits are fewer, i.e., 184 bits, than that of speech data bits, FACCH control signals are encoded more heavily to preserve the integrity of the control message during transmission. After such encoding, the FACCH message is, like speech, 456 bits long and is likewise interleaved. Instead of a traffic channel, however, the FACCH message is sent through a control channel, particularly, as part of the Associated Control Channel. Since both the traffic and control channels are logical channels sharing a common physical channel upon transmission, the control channel supersedes the traffic channel on the common physical channel and speech is lost.

Although under GSM 20 ms of speech are destroyed, the listener cannot recognize such a short interruption, particularly with sophisticated methods such as interpolation of speech and insertion of comfort noise at the receiver. Of course, frequent FACCH transmissions or retransmissions of erroneous FACCH messages will perceptibly impact speech quality.

Although alike to GSM in many ways, the ACeS system is designed to operate with much greater capacity. Because of the severe power and possible bandwidth limitations in a satellite communications system, however, speech must be coded at bit-rates of about ½ to ⅓ those in digital cellular, and because of cochannel and noise limited interference situations, more error correction is required than in land-based cellular, increasing the transmission bit-rate. Accordingly, instead of encoding speech at 13 Kps, ACeS codes speech at 4 Kps, which is equivalent to 80 bits per 20 ms, which after encoding becomes 120 bits in a non-robust or basic mode and 240 bits in a robust mode.

Figure 2:
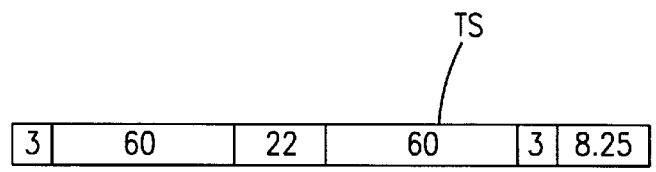
FIG. 2 is a block diagram illustrating the format of a frame timeslot in normal burst mode in ACeS.

The format of an ACeS timeslot burst is also different from that of a GSM burst, as shown in FIG. 2, and incorporates more data bits therein, i.e., 120 per burst ($D_1$ and $D_2$) as compared to 114 for GSM. The SYNC field is shortened and the flag bits $F_1$ and $F_2$ used in GSM are unnecessary in ACeS. This is due to the fact that the convolutional codes used in the transmission of each of these channels are different, and the passing of a Cycle Redundancy Check or CRC at the output of the convolutional decoder uniquely identifies the channel type. In ACeS, the 240 bits are preferably broken up into odd and even bursts, composed of odd and even bits of identical code. Interleaving is performed independently over the odd and even bursts, respectively. Whereas in robust mode both the odd even bursts are transmitted, only the odd bursts are sent in basic mode. It should of course be understood that the even bursts alone may also be sent.

In an effort to support more users, ACeS provides for multiple users per time slot, effectively becoming a 16-slot system in a full-rate satellite mode or a 32-slot system in a half-rate mode (a GSM "quarter-rate" mode). The use of the 32-slot mode or the 16-slot mode will depend upon the traffic distribution and channel conditions. Thus, instead of 8 simultaneous users in a GSM system, ACeS supports up to 32 users per downlink frequency pair in basic mode, and, in a robust speech mode, i.e., with more encoding, 16 users per downlink frequency pair.

The particular coding and interleaving employed in the ACeS system preferably makes the use of the 16- or 32-slot format completely transparent to the mobile or ground receivers, so that they do not need to be informed in advance of switching from one mode to the other by means of elaborate message exchanges.

Although the number of pertinent speech bits in ACeS are fewer per user, i.e., speech is coded at a lower rate, the number of FACCH, as well as Slow Associated Control Channel (SACCH) bits, would remain the same in ACeS at 184 bits if GSM protocols were strictly adhered to. Thus, expansion of FACCH (or SACCH or other such control signals) to 480 bits (240×2) means that 4 speech units, i.e., a set of consecutive speech data frames constituting 20 ms worth of speech, are required to transmit the FACCH message, destroying 80 ms of speech in either the basic or robust modes, four times the speech loss in GSM.

According to one proposed encoding protocol in ACeS, the 184 bits are encoded using the same Fire code as in GSM and at a rate ¼ convolutional coding scheme, which after encoding becomes either 960 or 480 bits, depending upon whether the user is operating in robust transmission mode (16 users) are in basic speech mode (32 users), respectively. The 184 bits are encoded by a Fire code, forming a 224-bit (40 bits for parity checking) message pursuant to a known Fire code, e.g., a cyclic burst error correcting code with generator polynomial:

$$g(x)=x^{23}+1)(x^{17}+x^3+1).$$

The 224-bit message is then convolutionally encoded in a convolutional encoder. As discussed, the 224-bit message may also be divided or punctured into two rate ½ codes of equal performance, one of which is transmitted on the even transmission frames and the other on the odd transmission frames, each of which carry the same information. It should be understood, however, that the receiver could always receive every frame, and determine from the synchronization correlation if the frame contains an intended burst or not. If another mobile user is allocated the burst, the synchronization code used will be orthogonal to that of the first mobile user to allow easy discrimination. An alternative encoding scheme is proposed in accordance with the present invention.

If both even and odd frames contain intended data, the combined bits from both rate ½ codes form a rate ¼ code with enhanced performance. Furthermore, the same received power is received on each burst, providing twice the power. Also, the rate ¼ code has potentially better performance than two rate ½ codes, giving some coding gain in addition. If only odd frames contain intended data, the even frames are ignored and not considered in the decoding process, which then gives the performance of a single rate ½ error correction code. In other words, both an even and an odd channel, respectively, are used in a robust transmission mode in ACeS and just the odd channel is used in the ACeS basic mode.

As a result of the longer length of the FACCH control signal message in relation to the length of a speech unit in ACeS, i.e., 20 ms worth, more speech is destroyed by a FACCH message under the ACeS system. Whereas in GSM, a single FACCH message, having the same length as the message containing 20 ms of speech, destroys at most that 20 ms, in ACeS, FACCH messages are considerably larger than that of speech, span multiple speech segments, and destroy those segments. As discussed, whereas an occasional 20 ms loss can be easily masked, an 80 ms sequential loss is clearly a perceptible loss that seriously affects the quality of speech. Shortening and restructuring the FACCH message protocol to minimize the impact to speech is, accordingly, the thrust of the present invention.

Figure 3:
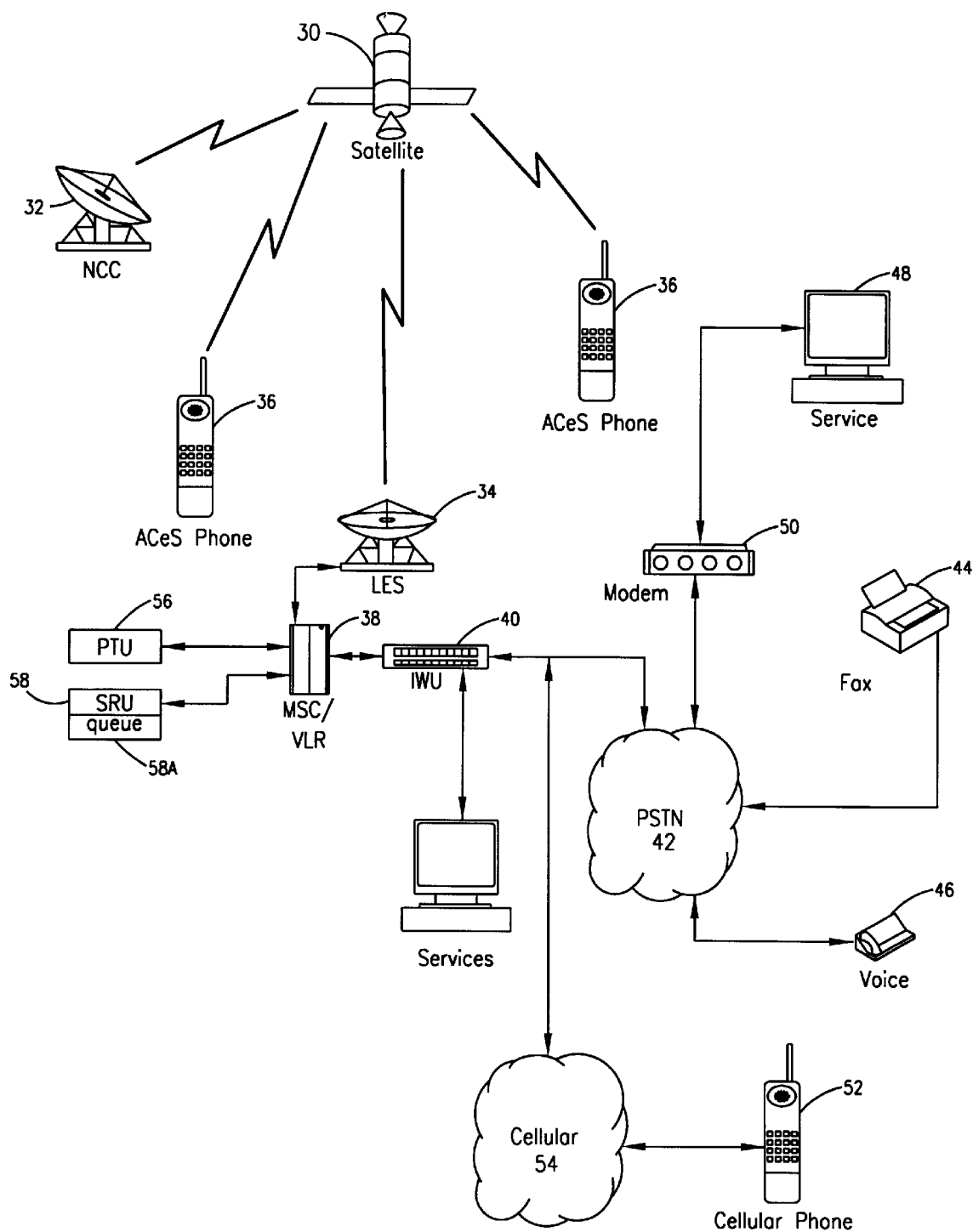
FIG. 3 illustrates a representative diagram of a satellite-cellular communication system which utilizes the improved communications system and method of the present invention.

A representative diagram of an ACeS satellite-cellular communication network is shown in FIG. 3. A satellite 30, such as one in geo-stationary orbit over SouthEast Asia in the ACeS system, forwards and receives digital information to and from a variety of land-based equipment, such as a Network Control Center (NCC) 32 for controlling call management functions, a Land-Earth Station (LES) 34 and a plurality of cellular phones 36. The LES 34, a mobile switching center/visitor location register (MSC/VLR) 38 and an interworking unit 40 handle the traffic channels.

Through the interworking unit 40, cellular communications are also accessible through a public Switched Telephone Network (PSTN) 42 to a facsimile 44, a regular non-cellular telephone 46 and a service computer 48 via a modem 50. Other cellular devices, such as other cellular phones 52, may also access the satellite through a cellular link 54.

In ACeS, FACCH handover messages are less common because each of the satellite's 140 beams has a broad footprint covering an area of approximately 800–1,000 kilometers in diameter. Thus, the aforedescribed lengthy FACCH messages for handling handovers are infrequent and are more for the convenience of an operator. Although infrequent, it is nonetheless a goal of the present invention to provide an improved communication system and method to ameliorate the deleterious effects of these long FACCH and other control messages, however prevalent, on speech transmissions and in systems other than ACeS also. It is also a goal of this invention to minimize the length of a FACCH message sent over the air.

Other control transmissions used in ACeS are more common and much shorter, leading to the determination that the standard, fixed 184-bit message format is an overdimensioning of the FACCH logical channel. Labeled Intelligent Network (IN) functions, these shorter control transmissions relate primarily to Dual Tone Multiple Frequency (DTMF) options, e.g., call-waiting, call-forwarding, voice mail-waiting, etc. These options represent very short messages, e.g., 2 bits to indicate that the message originates from an DTMF and 2–4 bits to indicate which button was pushed. This type of message is in sharp contrast to the much more elaborate handovers, which require channel selection, timing alignment adjustments and various other administrative information, and which require a full 184-bit message (plus encoding) whether or not the bits are useful, as well as padding or filling where necessary. Many of these shortened FACCH message options are, however, unavailable in GSM. Also, there is less need in GSM to minimize use of airlink resources.

In the present invention, the problem of lengthy FACCH or other control messages, caused by the need for fixed length message formats with filling, is overcome by the use of a protocol translation unit (PTU) 56, preferably located within the MSC/VLR 38, more preferably, within the MSC portion thereof, i.e., the network interface to the LES 34. The PTU 56 parses a given control signal message, ascertains the actual length of the given message and allocates the minimum number of transmission control signal segments necessary for transmitting that message. As pointed out, if DTMF codes are utilized, extremely short commands are possible, which under traditional encoding would nonetheless constitute at least an entire 184-bit base message length and a 456-bit (480 or 960 bits in ACeS) encoded message length, and destroy from 20 ms to 80 ms of speech. In particular, the protocol translation unit 56 of the present invention parses a length field within the FACCH message indicating the number of bytes in the message, and breaks the message in a plurality of 46-bit (184/4) control segments before encoding and transmitting each of them.

Figure 4:
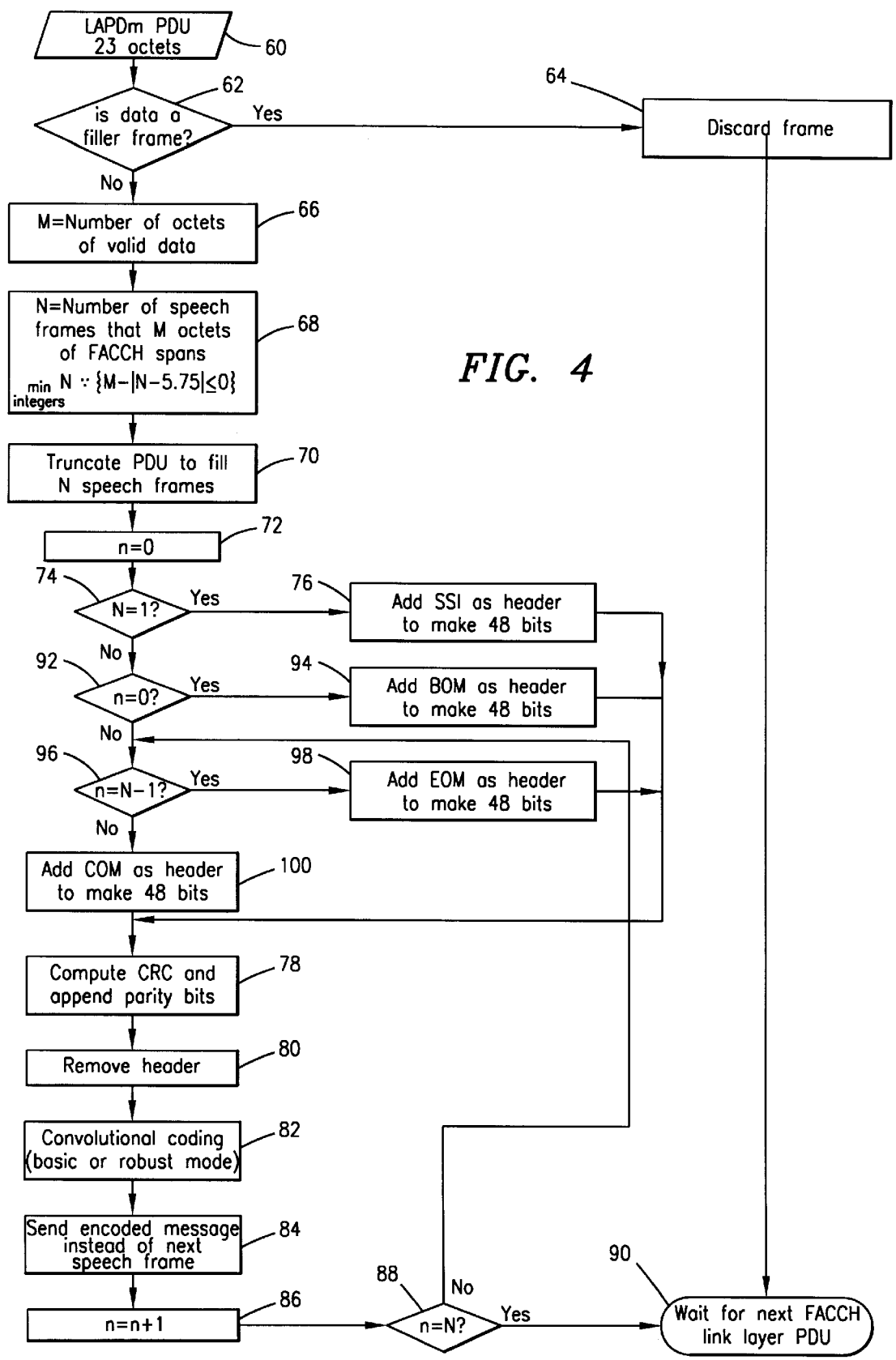
FIG. 4 is a flowchart illustrating the steps for transmitting a FACCH or other control signal message in accordance with the present invention.
Figure 5:
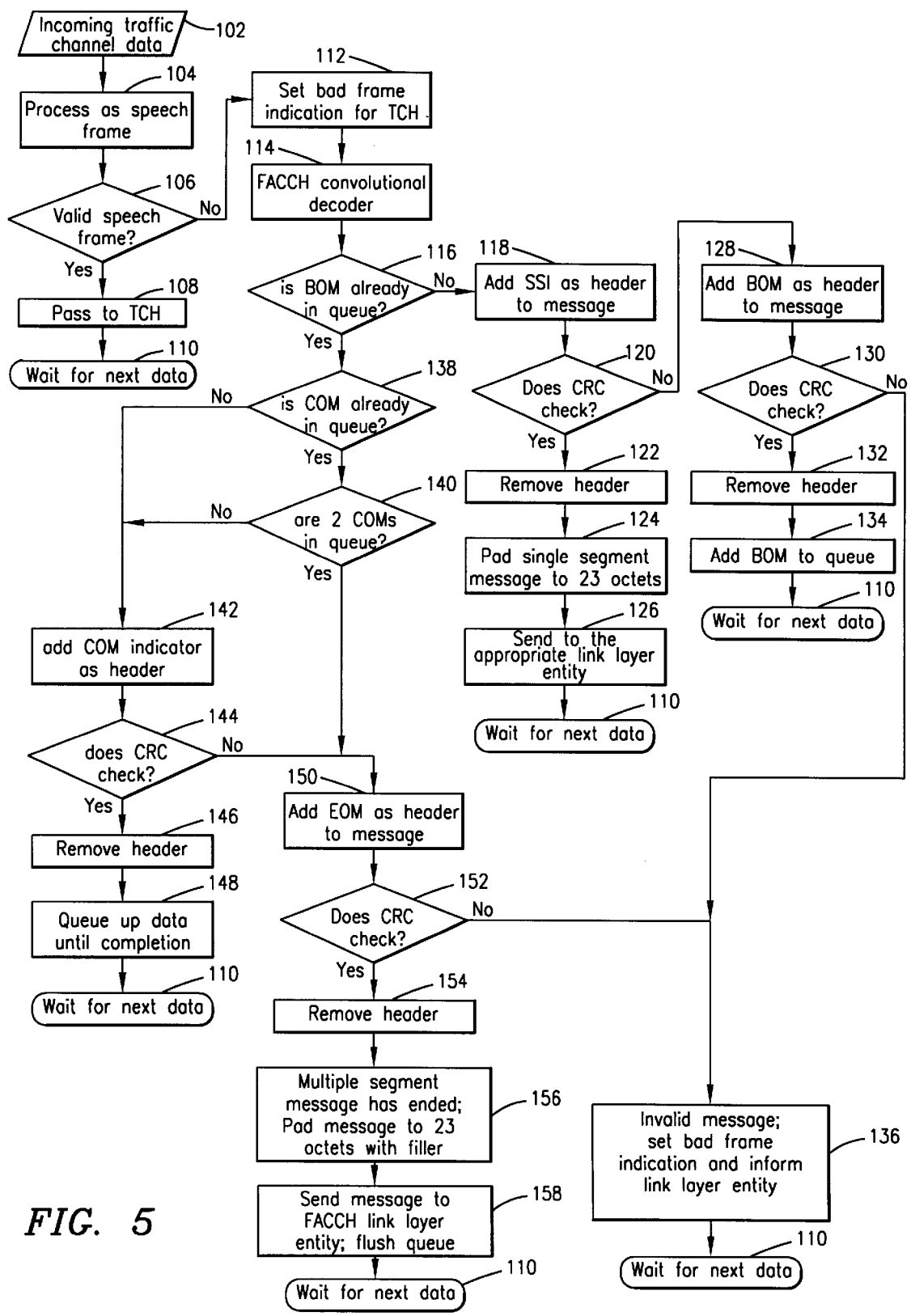
FIG. 5 is a flowchart illustrating the steps for receiving and reconstructing the FACCH or other control signal message of FIG. 4.

FIGS. 4 and 5 depict flowcharts illustrating the steps for transmitting and receiving, respectively, the aforedescribed FACCH or other control messages in accordance with the present invention.

Transmission Procedures

With reference now to FIG. 4, box 60 represents the receipt of the conventional 184-bit (23-byte) FACCH message or other data at the LAPDm link layer (Link Access Protocol for the D-Channel) of GSM which occurs in the interworking unit 40. At this layer, a message constituting less than the requisite 23 bytes is filled with the bit sequence 00101011 (or 11111111 on the mobile side). Further, whenever there is no data to send at a given time, a fill frame of 23 bytes is forwarded. As shown in FIG. 4, if the "message" is such a fill frame (box 62), the data is discarded (box 64).

If, however, box 62 indicates that there is data in the message, the number of bytes of data is determined (box 66), such as by reading the length field within a FACCH or other control signal message. A variable M is assigned the integer value equal to or greater than the number of data bits divided by 8, i.e., the number of bytes. The variable M ranges from 0 to 23 bytes (0 to 184 bits).

A second variable N is assigned (box 68) the integer value of the minimum number of frames required to transmit the aforesaid M bytes so that the following relationship is satisfied:

$$M - (N_{min} \times 5.75) \leq 0$$

Accordingly, if M=23 bytes, i.e., a full control signal message of 184 bits, then N=4. If M=5 bytes, e.g., a short IN message, then N=1. After N is determined, any extraneous portions of the message are truncated (box 70) so that the pertinent bits of the message fit within the allocated N frames, e.g., where M=5, only 40 bits are relevant and all bits past the minimum segment size of 46 bits of the message are truncated. In the preferred embodiment, the fill pattern for the non-pertinent bits 41–46 is "101011". If, however, 48 bits (M=6) are required for the control message, then two control signal segments are required (N=2) and all bits past the 96th (48×2) bit of the message are truncated, and remaining bits 49–96 are filled.

After M and N are ascertained, a counter variable n is initialized to the value 0 (box 72) and control is transferred to box 74 where a determination is made whether N=1, i.e., the message is a single segment message (SSI) such as an IN function. In the preferred embodiment of the present invention a descriptive header is then appended or concatenated to the control signal segment. Particularly, a two-bit header is added or concatenated to the 46-bit short message to make 48 bits (box 76). In the preferred embodiment of the present invention, the aforesaid SSI descriptive header is designated "00".

The resultant 48-bit message with descriptive header is then block encoded via a Cyclic Redundancy Check (CRC) with parity bits being appended (box 78) to the 48-bit message. In the preferred embodiment of the present invention, eight parity bits are added as tail bits to form a 56-bit message. However, after the CRC encoding, the two bits of the descriptive header are then removed (box 80), leaving a 54-bit message. The encoded message is sent convolutionally encoded (box 82), after addition of six tail bits in either basic or robust mode, using a rate ½ or a rate ¼ code with 64 states, respectively, and the encoded FACCH message is transmitted in lieu of speech (box 84). The counter n is then incremented (box 86) and compared to the value of N (box 88). If n=N, i.e., n=N=1 in this example of a short message, then the process is complete and awaits the next FACCH or other such control signal (box 90).

With reference to box 74, however, if N is not equal to 1, i.e., this is not a short SSI message, then the process steps to box 92, in which a determination is made whether n=0, i.e., this is the beginning of a multiple control signal segment message transmitted over multiple frames. If so, then a different descriptive header representing the beginning of message (BOM) is appended or concatenated to that 46-bit control signal segment to make 48 bits (box 94). In the preferred embodiment, BOM is a two-bit header designated "01". As with the SSI message, the 48-bit message and BOM header is then block or CRC encoded (box 78) and parity bits added. The appended BOM header is then removed (box 80) and the encoded message is convolutionally encoded after the addition of six tail bits and transmitted (boxes 82 and 84), n is incremented (box 86) and compared to N (box 88). Since this is the beginning of a multi-part, i.e.. multi-segment, message, control is then transferred to box 96, in which a determination is made whether n=N−1. If so, i.e., N=2 and the FACCH message is less than or equal to 92 bits (46×2) in length in this example, then an end of message (EOM) descriptive header is appended to the following 46-bit message segment to make 48 bits (box 98). In the preferred embodiment, EOM is a two-bit header designated "11". The 48 bits are then block encoded as described and convolutionally encoded without the EOM header and transmitted (boxes 78, 80, 82 and 84), respectively, as described. The counter n is again incremented (box 86) and compared to N (box 88). If the message is over, i.e., n=N=2, then the process is complete and awaits the next FACCH command (box 90).

With reference again to boxes 88 and 96, if n is not equal to N or N−1, then additional segments of the message follow the instant segment, and a continuation of message (COM) descriptive header is appended to the instant 46-bit message segment to make 48 bits (box 100). In the preferred embodiment, COM is a two-bit header designated "10". It should, therefore, be understood that the aforementioned descriptive headers, i.e., SSI, BOM, COM and EOM, are distinguishable by use of the aforedescribed two-bit binary code. As described, the 48 bits are then CRC block encoded with the descriptive header but convolutionally encoded without it (boxes 78, 80 and 82) and the message transmitted (box 84). The counter n is then incremented (box 86) and again compared with N (box 88). If N=3, i.e., three 46-bit segments are required to transmit the FACCH message, then the first segment will be block-encoded with the BOM descriptive header, the second segment will be block-encoded with the COM descriptive header, and the third segment will be block-encoded with the EOM descriptive header. If N=4, then an additional COM segment is required.

In the preferred embodiment of the present invention, the 46-bit message with the respective 2-bit descriptive header appended thereto is encoded with an 8-bit CRC with generator polynomial:

$$g(x) = x^8 + 1$$

to generate a systematically encoded message word of 56 bits (46+2+8). The appended two-bit header is then removed from the coded word, resulting in a conventional output message length of 54 bits. Although the bits constituting the descriptive header are removed, it should be understood that the information concerning that header is nonetheless incorporated into the message by virtue of the block encoding, i.e., the descriptive header information is in the parity of the remaining bits. Since no additional bits are required over that required per GSM protocol, the transmitted FACCH or other control signal message under ACeS conforms to the GSM standard format.

After the addition of the aforedescribed six tail bits, the 60-bit segment is convolutionally encoded using the generator polynomials:

$$g_1(x)=1+x^2+x^3+x^4+x^6$$
$$g_2(x)=1+x^2+x^3+x^4+x^6$$
$$g_3(x)=1+x+x^4+x^5+x^6$$
$$g_4(x)=1+x+x^2+x^5+x^6$$

to generate the encoded segments. If the basic mode is used, then the output of the convolutional code is alternatively punctured and the even bursts alone are sent. Alternatively, if the robust mode is used, then the convolutional code is alternatively punctured into even an odd bursts and both sets are sent.

Reception Procedures

With reference now to FIG. 5, the steps for receiving, processing and reconstructing the control signal message segments generated and transmitted in accordance with the process set forth in FIG. 4 are shown. After receipt of a given transmitted data segment (box 102), it is first processed as if it were speech (box 104). Since the majority of the transmitted frames FR contain speech data, this initial assumption is generally correct. If the data is determined to actually be speech (box 106), it is then passed to a traffic channel (box 108) for further action and transmission. The process then awaits the arrival of further segments (box 110).

If the incoming data is not speech (box 106), however, a bad frame indication, i.e., non-speech, is sent to the aforementioned traffic channel (box 112) and remedial action taken to continue coherent speech transmission, e.g., duplicate a previous speech segment, insert comfort noise, etc. Instead of speech, the incoming data is then treated as a control signal message, such as FACCH data, and is forwarded to a convolutional decoder (box 114) to deconvolute the message to a particular 54-bit block-encoded message, 46 bits of which constitute the transmitted FACCH message segment.

The process then determines (box 116) whether a BOM segment of the control signal message has already been placed in a queue 58A within a segment rebuilding unit 58, shown in FIG. 3, which like the PTU 56 is preferably located at the MSC/VLR 38 at the receiving end, and, more preferably, within the VLR. If a BOM segment of the control signal is not so queued, i.e., this is the first control signal segment of the control signal received, then the expected header is either SSI or BOM, depending upon whether the FACCH message is a single frame message (SSI) or the start of a multiple frame message (BOM). Accordingly, SSI is first added as a descriptive header (box 118) to the 46-bit control signal segment received to make a 48-bit segment ending in "00", which is then block encoded using the same CRC encoding as in transmission (box 78) to parity check the segment. An 8-bit transmitted CRC bit sequence is generated thereby.

If the 8-bit received CRC block encoded with this descriptive header parity checks or matches the parity of the aforedescribed 8-bit transmitted CRC (box 120), this indicates that the control signal message is indeed a short one (SSI). The appended descriptive header is again removed (box 122), and the message is padded with a filler sequence to fill the message to the full 184 bits (box 124) and forwarded to the appropriate link layer entity (box 126) for the appropriate action.

If, however, the CRC block encoding check in box 120 does not match, i.e., the parity of the transmitted CRC bits does not correspond with that of the generated CRC, then the message could be longer than 46 bits, and the other possibility, BOM, is then added as a descriptive segment header (box 128). The 46-bit control signal segment and BOM descriptive header results in a 48-bit segment ending with "01". The CRC of this 48-bit segment is then computed and its parity with the transmitted control signal segment checked (box 130). If the block encoding with this descriptive header matches, this indicates that the control signal message has been divided or segmented into two or more control signal segments, and that this segment is the start of the control signal message. The BOM header is then removed from the 48-bit message (box 132) to shorten the message segment back to 46 bits, and the BOM control signal segment is placed in the queue 58A (box 134) within the segment rebuilding unit 58. The process then awaits the reception of additional control signal segments (box 110). When this occurs, the set of valid descriptive headers to follow are "10" for COM and "11" for EOM.

If the CRC block encoding check in box 130 does not match, however, this indicates that the message is invalid (box 136), and that the process should await further data (box 110). In other words, if a given received control signal message fails to begin with either an SSI or BOM descriptive header, then something is in error.

With reference again to box 116, if a BOM control signal segment is already in the queue 58A, then the process checks to determine if any subsequent segments follow, e.g., whether a COM control signal segment is in the queue 58A (box 138). If so, the process then determines whether there are two such COM control signal segments within in the queue 58A (box 140). If no or only one COM control signal segment is in the queue 58A, then the descriptive header COM is added as a header to the instant received control signal segment of 46 bits to make a 48-bit segment ending with "00" (box 142). If the CRC block encoding checks (box 144), i.e., the parities of the received control signal segment matches that of the transmitted segment, then the COM descriptive header is removed (box 146), the COM control signal segment is queued (box 148) in queue 58A and the process awaits further data (box 110).

If, however, the CRC does not check in box 144 or if there are two COM central signal segments in the queue 58A (box 140), then the control signal message may be at an end and the EOM descriptive header is appended to the instant 46-bit control signal segment to make a 48-bit segment ending with "11" (box 150). The CRC is then again checked (box 152), as described, and, if a parity match is found, this indeed indicates that the control signal message ends with the instant segment. The EOM descriptive header is then removed from the control signal segment (box 154) to shorten the message to the original 46 bits. Having received the final segment of the transmitted control signal, as indicated by the EOM descriptive header, the segment rebuilding unit 58 then reconstructs the entire control signal by concatenating the first, BOM control signal segment and any subsequent COM segments, on the queue 58A, with the concluding EOM control signal segment. The entire control signal message is then padded, if necessary, to 184 bits with filler (box 156) before forwarding the message for processing to the higher LAPDm link layer and flushing the queue 58A (box 158). If the CRC in box 152 does not match, i.e., the segment is neither an SSI, BOM, COM or EOM control signal segment, the message is invalid (box 136) and the process should await further data (box 110).

In the above manner, the segment rebuilding unit 58 queues a plurality of transmitted control signal segments within queue 58A therein. It should be understood that, in accordance with the system and method of the present invention, the aforedescribed control signal, transmitted and received in pieces, is reconstructed properly even if the transmission and receipt of the control signal segments are non-sequential, i.e., a multiplicity of speech or other non-control transmissions separate the various control signal segments of a given control signal. Indeed, there need be no periodicity regarding the transmission and receipt of the aforedescribed control signal segments of said given control signal and the various segments thereof may be forwarded asynchronously, as will be further described herein. When the segments are all together and the control signal message is complete, i.e., the BOM (or SSI) control signal segment and any COM control signal segments are stored in queue 58A, the segment rebuilding unit 58 reconstructs the control signal from the asynchronously received control signal segments into a control signal in accordance with the expected format, e.g., a 184-bit FACCH message specified in the GSM specification, which is then forwarded to the link layer.

It should further be understood that the protocol translation unit 56, connected at the network interface to the LES 34, not only parses the FACCH or other lengthy control signal messages into smaller control signal segments, but also determines the time of transmission for each of those control signal segments. For example, if a given FACCH message is determined to span 16 transmission frames, e.g., a 960-bit transmission in robust mode, 80 ms of speech may be lost if the control signal segments for that FACCH message are transmitted consecutively or sequentially, as is done in current systems. Instead, the protocol translation unit 56 of the present invention preferably transmits the control signal segments asynchronously or according to a selected protocol, whereby the deleterious impact to speech caused by a lengthy sequential control transmission is prevented or minimized.

In other words, the destruction of speech is spread over a larger timespan so that there is an imperceptible impact to the clarity of speech. In the presently preferred embodiment, for example, the only restriction on dividing a lengthy FACCH or other such control transmission into segments is that the entire FACCH message, constituting the equivalent of 1–4 speech units of 20 ms each, be transmitted and received within a fixed number of frames from the transmission of the first such segment (BOM), preferably within one multiframe therefrom. Thus, FACCH and other overriding or blocking control transmissions steal speech frames less obtrusively, preserving speech quality by non-sequentially interspersing the control segments within a broader span of speech frames, consecutive sequential groups of which form a unit of speech, e.g., 20 ms worth, as described heretofore. By use of the term non-sequential, it is meant that successive segments of the FACCH message do not get transmitted one after the other.

It should further be understood that the communications system and method of the present invention maintains the link layer format defined in the GSM specification, allowing the use of existing GSM network equipment beyond the LES 34. In other words, the present invention is a translator that converts a given link layer format to a Medium Access Control format.

It should additionally be understood that through the use of the aforedescribed system and method, not only lengthy control signal messages are handled in an improved manner, but short-length FACCH or other control signal messages are preferably not transmitted according to the more lengthy 184-bit (encoded to 480 or 960 bits) fixed length format, which steals 1–4 units of speech. Instead, through the use of the aforedescribed control signal segments and a non-transmitted message header, such as SSI, short FACCH messages can be transmitted in an ACeS system also utilizing lengthy FACCH messages with prior parsing and translating by the protocol translation unit 56. Upon reception, the shortened message can be reconstructed and reconstituted by the aforedescribed segment rebuilding unit 58 to the full 184-bit FACCH message for further processing in accordance with the standard protocol. Whereas normally a FACCH or other control signal would steal the entire amount of time, regardless of the length of the control signal, an advantage of the present invention is that only the minimum unit of such time is used if a short control signal is indicated, reducing the interruption to speech accordingly. As discussed, this principle is further implemented by segmenting a lengthy FACCH message into smaller portions.

It should, of course, be understood that the descriptive headers used herein are different from one another so that the parity of a block-encoded control signal segment with a particular descriptive header appended thereto will differ from the block-encoding of the same segment with another header. It should further be understood that additional headers may be added, e.g., COM1, COM2, etc., and additional appended digits may be employed to further distinguish the headers. Furthermore, although the illustrated embodiment employed at most two COM headers, it should be understood that additional COM control segments may be employed for longer control signals.

It should also be understood that in an alternate embodiment of the invention, the SSI header could be implemented with the same header as EOM. This would entail modifying box 76 in FIG. 4 to append EOM instead of SSI at the transmitting end, and modifying box 118 in FIG. 5 to append EOM instead of SSI at the receiving end. The unused 2-digit binary, ebb, "00", could then be used for other purposes.

It should further be understood that the protocol translation unit 56 and the segment rebuilding unit 58, both preferably located within the MSC/VLR 38, may be implemented in either software or hardware.

While the invention has been described in connection with preferred embodiments thereof, it is to be understood that the scope of the invention is not limited to the described embodiment, but is intended to encompass various modifications and equivalents within the spirit and scope of the appended claims.

What is claimed is:

1. In a telecommunications system having a first communication system and a second communication system, the first and second communication systems coupled together by way of a communication channel, a combination with the first and second communication systems of communication circuitry for transmitting and receiving, respectively, a plurality of control signal segments therebetween, said circuitry comprising:

transmission means within said first communication system, said transmission means generating and transmitting a substantially continuous series of transmission frames containing speech therein across said communication channel, said transmission means also generating and transmitting a plurality of transmission frames of a control signal across said communication channel, said control signal having precedence over said speech and the plurality of control signal frames overriding a corresponding plurality of the speech frames, the substantially continuous series of speech frames being divided into sequential sets of said frames, each of said sets constituting a unit of speech; and segmentation means attached to said transmission means for segmenting said control signal into said plurality of control signal segments, each of said control signal segments being transmitted by said transmission means within at least one of the control signal transmission frames, where each of said plurality of control signal segments transmitted on said at least one of the control signal transmission frame overrides at most one unit of speech in one of said sequential sets, and where each of the speech sets overridden by the individual control signal segments of said control signal is separated from other overridden speech sets by a plurality of speech sets therebetween.

2. The communication circuitry according to claim 1, further comprising:

reception means within said second communication system, said reception means for receiving said substantially continuous sequence of transmission frames containing therein said speech frames and said control signal frames across said communication channel; and segment reconstruction means within said reception means for reconstructing said control signal from said plurality of control signal segments received.

3. The communication circuitry according to claim 1, wherein said control signal is a Fast Associated Control Channel signal.

4. The communication circuitry according to claim 1, wherein said control signal has a variable length.

5. The communication circuitry according to claim 4, wherein the variable-length control signal has a minimum length of one of said control signal segments.

6. The communication circuitry according to claim 1, wherein said control signal has a fixed length, said fixed length being a fixed multiple of the length of one of said control signal segments.

7. The communication circuitry according to claim 1, wherein the length of said control signal is greater than the length of speech within said one unit of speech.

8. The communication circuitry according to claim 7, wherein the speech within said one unit of speech is equivalent to approximately 20 ms of speech.

9. The communication circuitry according to claim 1, wherein a control signal data within one control signal segment is transmitted over one of said plurality of control signal frames.

10. The communication circuitry according to claim 9, wherein the length of said control signal data is at most 46 bits.

11. The communication circuitry according to claim 1, wherein said control signal segments of said control signal are transmitted non-sequentially across said channel.

12. The communication circuitry according to claim 1, wherein said control signal comprises an Intelligent Network function.

13. The communication circuitry according to claim 2, further comprising:

block encoding means attached to said segmentation means, said block encoding means for block encoding each of said plurality of control signal segments, where said block encoding means appends a descriptive header to each respective control signal segment prior to block encoding, block encodes said respective control signal segment and generates a block-encoded portion corresponding to said respective control signal segment, and removes said descriptive header from said respective control signal segment after said block encoding, said respective control signal segment and corresponding block-encoded portion being transmitted by said transmitter.

14. The communication circuitry according to claim 13, further comprising:

block decoding means attached to said segment reconstruction means, said block decoding means for block decoding said control signal segments generated by said block encoding means and transmitted by said transmission means, where said block decoding means appends a decoding descriptive header to each respective control signal segment received by said reception means, block encodes said respective control signal segment along with said decoding descriptive header, generates a received-block-encoded portion corresponding to said respective control signal segment, and compares the received-block-encoded portion to said block-encoded portion.

15. The communication circuitry according to claim 13, wherein said block encoding means uses a parity checker.

16. The communication circuitry according to claim 13, wherein said block encoding means uses a cyclic redundancy check.

17. The communication circuitry according to claim 13, wherein said descriptive header varies according to the position of said control signal segment within said control signal.

18. The communication circuitry according to claim 17, wherein a beginning descriptive header is appended to the first said control signal segment of said control signal.

19. The communication circuitry according to claim 17, wherein an ending descriptive header is appended to the last said control signal segment of said control signal.

20. The communication circuitry according to claim 17, wherein an intermediate descriptive header is appended to a plurality of control signal segments disposed between the first and the last of said control signal segments of said control signal.

21. The communication circuitry according to claim 13, wherein said descriptive header is a two-bit binary number.

22. The communication circuitry according to claim 2, further comprising:

convolutional encoding means attached to said segmentation means, said convolutional encoding means for convolutionally encoding each of said control signal segments prior to transmission, creating respective convolutionally encoded portions.

23. The communication circuitry according to claim 22, further comprising:

convolutional decoding means attached to said segment reconstruction means, said convolutional decoding means for convolutionally decoding each of the convolutionally encoded portions received.

24. The communication circuitry according to claim 2, wherein said segment reconstruction means includes a queue for storing a plurality of control signal segments received by said receiver.

25. The communication circuitry according to claim 1, wherein said telecommunications system is an ACeS system.

26. A telecommunications system having a transmitter and a receiver coupled together by way of a communication channel, a substantially continuous series of transmission frames containing speech and a plurality of control signals therein passing across said channel from said transmitter to said receiver, said plurality of control signals having precedence over and overriding said speech, said speech being divided into sequential speech portions, said telecommunications system comprising:

a segmenter, attached to said transmitter, for segmenting said plurality of control signals into a respective plurality of control signal segments, each said control signal segments overriding at most one speech portion within said transmission frames, the overridden speech portions being separated from each other by a plurality of speech portions therebetween.

27. The telecommunications system according to claim 26, further comprising:

a segment reconstructor, attached to said receiver, for receiving said transmission frames of speech and control signals, and reconstructing said control signal.

28. The telecommunications system according to claim 26, wherein said control signal is a Fast Associated Control Channel signal.

29. The telecommunications system according to claim 26, wherein said control signal has a variable length.

30. The telecommunications system according to claim 29, wherein the variable-length control signal has a minimum length of one of said control signal segments.

31. The telecommunications system according to claim 26, wherein said control signal has a fixed length, said fixed length being a fixed multiple of the length of one of said control signal segments.

32. The telecommunications system according to claim 26, wherein the length of said control signal is greater than the length of speech within said one speech portion.

33. The telecommunications system according to claim 32, wherein the speech within said one speech portion is equivalent to approximately 20 ms of speech.

34. The telecommunications system according to claim 26, wherein the control signal data within one control signal segment is transmitted over one of said transmission frames.

35. The telecommunications system according to claim 34, wherein the length of said control signal data is at most 46 bits.

36. The telecommunications system according to claim 26, wherein said control signal segments of said control signal are transmitted non-sequentially across said channel.

37. The telecommunications system according to claim 26, wherein said control signal comprises an Intelligent Network function.

38. The telecommunications system according to claim 27, further comprising:

an encoder, attached to said segmenter, for encoding said control signal segments, said encoder appending a descriptive header to each respective control signal segment prior to encoding, block encoding said respective control signal segment and generating a block-encoded portion corresponding to said control signal segment, and removing said descriptive header from said respective control signal segment after encoding, said control signal segment and corresponding block-encoded portion being transmitted by said transmitter.

39. The telecommunications system according to claim 38, further comprising:

a decoder, attached to said segment reconstructor, for decoding said control signal segment, said decoder appending a decoding descriptive header to each respective control signal segment received by said receiver, block encoding said respective control signal segment along with said decoding descriptive header and generating a received-block-encoded portion corresponding to said control signal segment, and comparing said received-block-encoded portion to said block-encoded portion.

40. The telecommunications system according to claim 38, wherein said encoder uses a parity checker.

41. The telecommunications system according to claim 38, wherein said encoder uses a cyclic redundancy check.

42. The telecommunications system according to claim 38, wherein said descriptive header varies according to the position of said control signal segment within said control signal.

43. The telecommunications system according to claim 42, wherein a beginning descriptive header is appended to the first said control signal segment of said control signal.

44. The telecommunications system according to claim 42, wherein an ending descriptive header is appended to the last control signal segment of said control signal.

45. The telecommunications system according to claim 42, wherein an intermediate descriptive header is appended to a plurality of control signal segments disposed between the first and the last of said control signal segments of said control signal.

46. The telecommunications system according to claim 38, wherein said descriptive header is a two-bit binary number.

47. The telecommunications system according to claim 27, further comprising:

a convolutional encoder, attached to said segmenter, for convolutionally encoding each of said control signal segments prior to transmission by said transmitter, creating respective convolutionally encoded portions.

48. The telecommunications system according to claim 47, further comprising:

a convolutional decoder, attached to said segment reconstructor, for convolutionally decoding each of said convolutionally encoded portions received by said receiver.

49. The telecommunications system according to claim 27, wherein the segment reconstructor includes a queue for storing a plurality of control signal segments received by said receiver.

50. The telecommunications system according to claim 26, wherein said telecommunications system is an ACeS system.

51. A method for forwarding a control signal from a first communication system to a second communication system across a communication channel, said first communication system transmitting a substantially continuous series of transmission frames across said communication channel to said second communication system, a multiplicity of said transmission frames containing speech therein, a sequential set of the speech frames constituting a unit of speech, said method comprising the steps of:

determining, at the first communication system, the length of said control signal and dividing said control signal into a plurality of control signal segments; and transmitting, from the first communication system across said communication channel to the second communication system, said plurality of control signal segments within said substantially continuous series of transmission frames, each of said control signal segments being transmitted within at least one of said transmission frames in said substantially continuous series and overriding at most one unit of speech, each of the speech sets being overridden by a respective control signal segment of said control signal being separated from other overridden speech sets by a plurality of speech sets therebetween.

52. The telecommunications system according to claim 51, further comprising the steps of:

receiving, at the second communication system, said substantially continuous series of transmission frames containing therein said speech frames and said plurality of control signal frames; and reconstructing, within said second communication system, said control signal from said plurality of transmitted control signal segments.

53. The method according to claim 52, further comprising after said step of determining and before said step of transmitting, the step of:

block encoding each of said plurality of control signal segments by appending a descriptive header to each respective control signal segment prior to block encoding, block encoding said respective control signal segment and generating a block-encoded portion corresponding to said respective control signal segment, and removing said descriptive header from said respective control signal segment after block encoding, said control signal segment and corresponding block-encoded portion being transmitted during said transmitting step.

54. The method according to claim 53, wherein said step of reconstructing comprises:

decoding each of said control signal segments received by appending a decoding descriptive header to each respective control signal segment, block encoding said respective control signal segment and generating a received-block-encoded portion correspondingly to said respective control signal segment, and comparing said received-block-encoded portion to said block-encoded portion.

55. The method according to claim 53, wherein said descriptive header varies according to the position of said control signal segment within said control signal.

56. The method according to claim 55, wherein a beginning descriptive header is appended to the first said control signal segment of said control signal.

57. The method according to claim 55, wherein an ending descriptive header is appended to the last control signal segment of said control signal.

58. The method according to claim 55, wherein an intermediate descriptive header is appended to a plurality of control signal segments disposed between the first and the last of said control signal segments of said control signal.

59. The method according to claim 52, further comprising, after said step of determining and before said step of transmitting, the step of:

convolutionally encoding each respective control signal segment, creating respective convolutionally-encoded portions.

60. The method according to claim 59, wherein said step of reconstructing comprises:

convolutionally decoding each said respective convolutionally-encoded portions.

* * * * *

UNITED STATES PATENT AND TRADEMARK OFFICE
CERTIFICATE OF CORRECTION

PATENT NO.   : 5,881,105
DATED        : Mar. 9, 1999
INVENTOR(S) : Balachandran et al.

It is certified that error appears in the above-identified patent and that said Letters Patent is hereby corrected as shown below:

Column 5, line 28       Replace "$x^{23}$"
                        With --($x^{23}$--

Column 10, line 45      Replace ""00""
                        With --"01"--

Column 12, line 46      Replace "ebb,"
                        With --e.g.,--

Column 13, line 19      Replace "frame"
                        With --frames--

Signed and Sealed this

Third Day of August, 1999

Attest:

Attesting Officer

Q. TODD DICKINSON

Acting Commissioner of Patents and Trademarks